Jan. 17, 1928.
W. J. ANDRES
1,656,261
BRAKE OPERATING CONNECTION
Filed Dec. 17, 1925
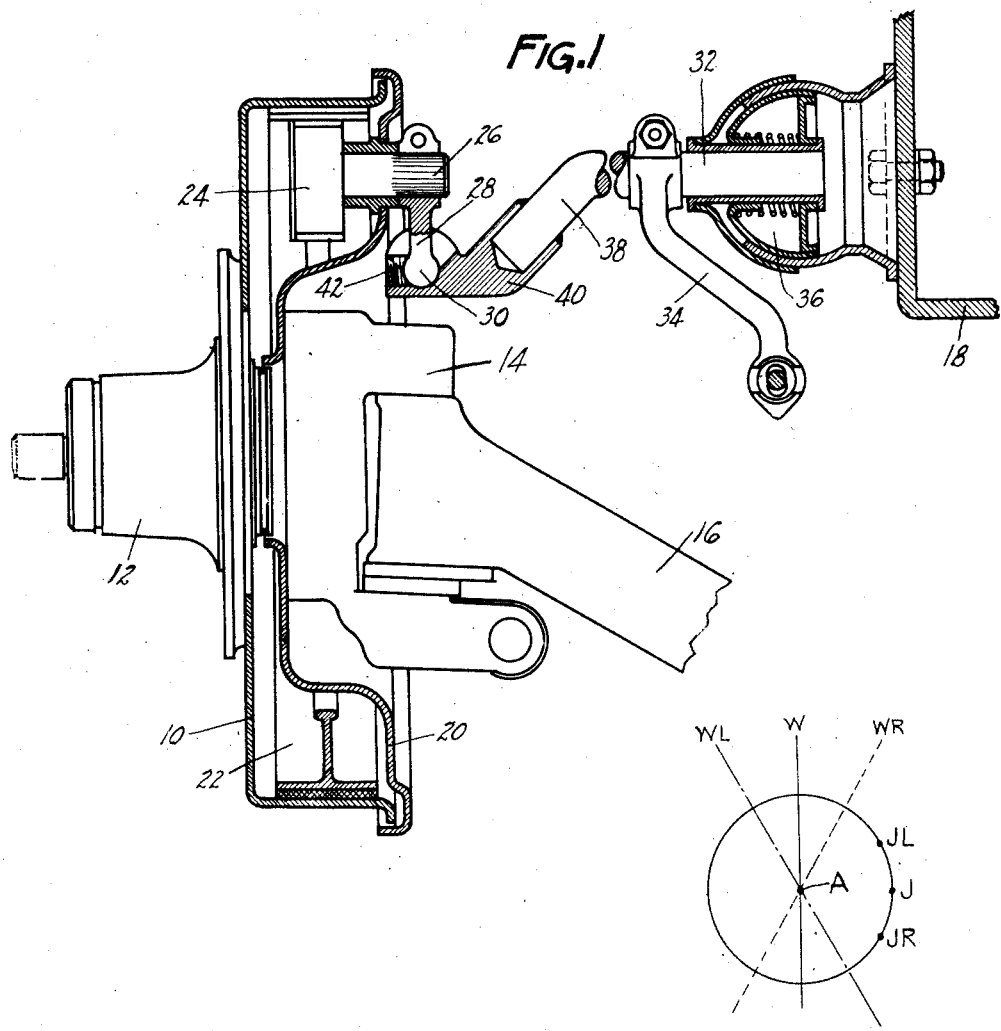
INVENTOR
WILLIAM J. ANDRES
BY
*Jn. W. McConkey*
ATTORNEY Patented Jan. 17, 1928.

1,656,261

UNITED STATES PATENT OFFICE.

WILLIAM JOSEPH ANDRES, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING CONNECTION.

Application filed December 17, 1925. Serial No. 75,925.

This invention relates to brakes, and is illustrated as embodied in novel operating connections for a front wheel automobile brake. An object of the invention is to provide a shaft brake control, preferably of the type in which the inner end of the shaft is movably supported on the chassis frame, which is interchangeable with the lever of a control of the type in which a horizontal lever, usually fulcrumed on the axle, rocks a brake-applying arm swivelling with the wheel.

Having this object in mind, the shaft is provided with an arm-engaging crank part, preferably rigid with the shaft, so that rocking the shaft serves to swing the arm to apply the brake. In the particular embodiment illustrated in the drawings, the crank part of the shaft has a socket embracing a ball on the end of the brake-applying arm, thus forming a universal joint connection.

In the usual arrangement of the control, the interengaging crank and arm parts are movable in applying the brake from an idle position spaced some distance from the swivelling axis of the wheel to an active position in or immediately adjacent that axis,—e. g., the center of the above-described ball, when the brake is applied, is in or immediately adjacent the swivelling axis of the wheel.

According to an important minor feature of the invention, in order to relieve or otherwise vary the pressure on the brake when the wheel is swivelled, the active position of the parts just described is not exactly in the swivelling axis, but is spaced slightly at one side, preferably on the side opposite the wheel.

The above and other objects and features of the invention, including various novel combinations of parts and desirable particular constructions, will be apparent from the following description of one illustrative embodiment shown in the accompanying drawing, in which:

Fig. 1 is a vertical section through one front brake and associated parts; and

Fig. 2 is a diagram, corresponding to a top plan view, illustrating how the pressure is relieved on the outer brake on a turn.

The particular brake illustrated includes a drum 10 rotating with a wheel, the hub of which appears at 12, and which is mounted on the spindle of a knuckle 14 swivelled at one end of the front axle 16. Axle 16, with a rear axle (not shown), supports through the usual springs a chassis frame 18. The open side of drum 10 is closed by a backing plate or other stationary support 20. The brake itself includes internal shoes 22 expanded against the drum 10 by means such as a cam 24 on a shaft 26 supported by the backing plate 22. Except as further described below, the above-identified parts or their equivalents may be of any desired construction.

The brake is applied by an arm 28 on shaft 26. Arm 28 swivels with the wheel, and has an end ball or other part 30 movable in applying the brake from an idle position in which its center is spaced some distance from the swivelling axis to an active position in which its center is in or immediately adjacent that axis.

Arm 28 is operated by a shaft 32 rocked by an arm 34, and is preferably supported on the chassis frame for universal angular movement and for sliding axial movement, by a suitable support 36. Shaft 32 has a crank part 38, to which is welded or otherwise rigidly secured, in this particular embodiment, a socket 40 embracing ball 30. A threaded plug 42 prevents ball 30 from leaving the socket.

When it is desired to relieve the pressure on the brake when its wheel is on the outer side of a turn, to guard against skidding, the center of ball 30 or the like is not exactly in the swivelling axis when the brake is applied, but is five or six hundredths of an inch from that axis, on the side opposite the wheel. This condition is illustrated on a much enlarged scale in Fig. 2, which is a diagram representing a top plan view.

In this diagram, "W" is a line through the swivelling axis "A" of the wheel, parallel to the wheel when the vehicle is running straight ahead. "WR" and "WL" are respectively parallel to the wheel when swivelled to the right (on the outer side of the turn) and to the left (on the inner side of the turn).

The position of the center of ball 30 (in this particular arrangement), with the brake applied, is at "J" when the wheel is parallel to "W". Now when the wheel is on the outer side of the turn, parallel to "WR", this center tends to move to "JR", relieving the pressure on the brake; whereas when the wheel is on the inner side of the turn, parallel to "WL", the center of ball 30 tends to move to "JL", increasing slightly the pressure on the brake.

While one illustrative embodiment has been described in detail, it is not my intention to limit the scope of the invention to that particular embodiment, or otherwise than by the terms of the appended claims.

I claim:

1. A vehicle including a chassis frame and a wheel having a brake, and comprising, in combination therewith, a pivoted brake-applying arm, a brake-operating shaft supported at its inner end by the frame and having its axis substantially intersecting one end of said arm, and a crank part rocked by the shaft and pivotally connected directly to said brake-applying arm.

2. A vehicle including a chassis frame and a wheel having a brake, and comprising, in combination therewith, a brake-applying arm, a brake-operating shaft supported at its inner end by the frame, and a crank part rocked by the shaft and universally jointed directly to said brake-applying arm and supported at its outer end by said arm.

3. A vehicle including a chassis frame and a wheel having a brake, and comprising, in combination therewith, a pivoted brake-applying arm, and a brake-operating shaft having its axis substantially intersecting the pivoted end of said arm and which has a cranked part at its outer end universally jointed to said brake-applying arm and supporting said outer end.

4. A vehicle including a chassis frame and a swivelled wheel having a brake, and comprising, in combination therewith, a brake-applying arm swivelling with the wheel and having a part movable in applying the brake from an idle position spaced from the swivelling axis of the wheel to an active position immediately adjacent that axis, a brake-operating shaft supported at its inner end by the frame, and a crank part rocked by the shaft and operatively engaging said part of the brake-applying arm, the interengaging parts of the crank part and the arm being so arranged with respect to the swivelling axis of the wheel that swivelling the wheel varies the pressure on the brake.

5. A vehicle including a swivelled wheel having a brake, and comprising, in combination therewith, a brake-applying arm swivelling with the wheel and having a part movable in applying the brake from an idle position spaced from the swivelling axis of the wheel to an active position immediately adjacent that axis, a brake-operating shaft, and a crank part rocked by the shaft and operatively engaging said part of the brake-applying arm, the interengaging parts of the crank part and the arm being so arranged with respect to the swivelling axis of the wheel that swivelling the wheel varies the pressure on the brake.

6. A vehicle including a chassis frame and a swivelled wheel having a brake, and comprising, in combination therewith, a brake-applying arm swivelling with the wheel and having a part movable in applying the brake from an idle position spaced from the swivelling axis of the wheel to an active position immediately adjacent that axis, a brake-operating shaft supported at its inner end by the frame, and a crank part rocked by the shaft and operatively engaging said part of the brake-applying arm, the interengaging parts of the crank part and the arm being so arranged with respect to the swivelling axis of the wheel that swivelling the wheel to place it on the outer side of a turn relieves the pressure on the brake.

7. A vehicle including a swivelled wheel having a brake, and comprising, in combination therewith, a brake-applying arm swivelling with the wheel and having a part movable in applying the brake from an idle position spaced from the swivelling axis of the wheel to an active position immediately adjacent that axis, a brake-operating shaft, and a crank part rocked by the shaft and operatively engaging said part of the brake-applying arm, the interengaging parts of the crank part and the arm being so arranged with respect to the swivelling axis of the wheel that swivelling the wheel to place it on the outer side of a turn relieves the pressure on the brake.

8. A vehicle including a chassis frame and a swivelled wheel having a brake, and comprising, in combination therewith, a brake-applying arm swivelling with the wheel and having a part movable in applying the brake from an idle position spaced from the swivelling axis of the wheel to an active position immediately adjacent that axis, a brake-operating shaft supported at its inner end by the frame, and a crank part rocked by the shaft and operatively engaging said part of the brake-applying arm, the interengaging parts of the crank part and the arm being relatively movable in swivelling the wheel about a point spaced slightly from the swivelling axis on the opposite side from the wheel.

9. A vehicle including a swivelled wheel having a brake, and comprising, in combination therewith, a brake-applying arm swivelling with the wheel and having a part movable in applying the brake from an idle position spaced from the swivelling axis of the wheel to an active position immediately adjacent that axis, a brake-operating shaft, and a crank part rocked by the shaft and operatively engaging said part of the brake-applying arm, the interengaging parts of the crank part and the arm being relatively movable in swivelling the wheel about a point spaced slightly from the swivelling axis on the opposite side from the wheel.

10. A vehicle including a chassis frame and a swivelled wheel having a brake, and comprising, in combination therewith, a brake-applying arm swivelling with the wheel and having a ball at its end, the ball being movable in applying the brake from an idle position in which its center is spaced some distance from the swivelling axis to an active position slightly spaced from that axis on the opposite side from the wheel, and a brake-operating shaft supported at its inner end on the frame, and a crank part rocked by the shaft and engaging said ball.

11. A vehicle including a swivelled wheel having a brake, and comprising, in combination therewith, a brake-applying arm swivelling with the wheel and having a ball at its end, the ball being movable in applying the brake from an idle position in which its center is spaced some distance from the swivelling axis to an active position slightly spaced from that axis on the opposite side from the wheel, and a brake-operating shaft and a crank part rocked by the shaft and engaging said ball.

12. A vehicle including a chassis frame and a swivelled wheel having a brake, and comprising, in combination therewith, a brake-applying arm swivelling with the wheel and having a ball at its end, the ball being movable in applying the brake from an idle position in which its center is spaced some distance from the swivelling axis to an active position in or immediately adjacent that axis, and a brake-operating shaft supported at its inner end on the frame and a crank part rocked by the shaft and engaging said ball.

13. A vehicle including a chassis frame and a swivelled wheel having a brake, and comprising, in combination therewith, a brake-applying arm swivelling with the wheel and having a ball at its end, the ball being movable in applying the brake from an idle position in which its center is spaced some distance from the swivelling axis to an active position in or immediately adjacent that axis, a brake-operating shaft supported at its inner end on the frame, and a crank part rocked by the shaft and having a socket embracing said ball.

14. A vehicle including a chassis frame and a swivelled wheel having a brake, and comprising, in combination therewith, a brake-applying arm swivelling with the wheel and having a ball at its end, the ball being movable in applying the brake from an idle position in which its center is spaced some distance from the swivelling axis to an active position in or immediately adjacent that axis, and a brake-operating shaft supported at its inner end on the frame and having a crank part with a socket embracing said ball.

In testimony whereof, I have hereunto signed my name.

WILLIAM JOSEPH ANDRES.